Figure 1:
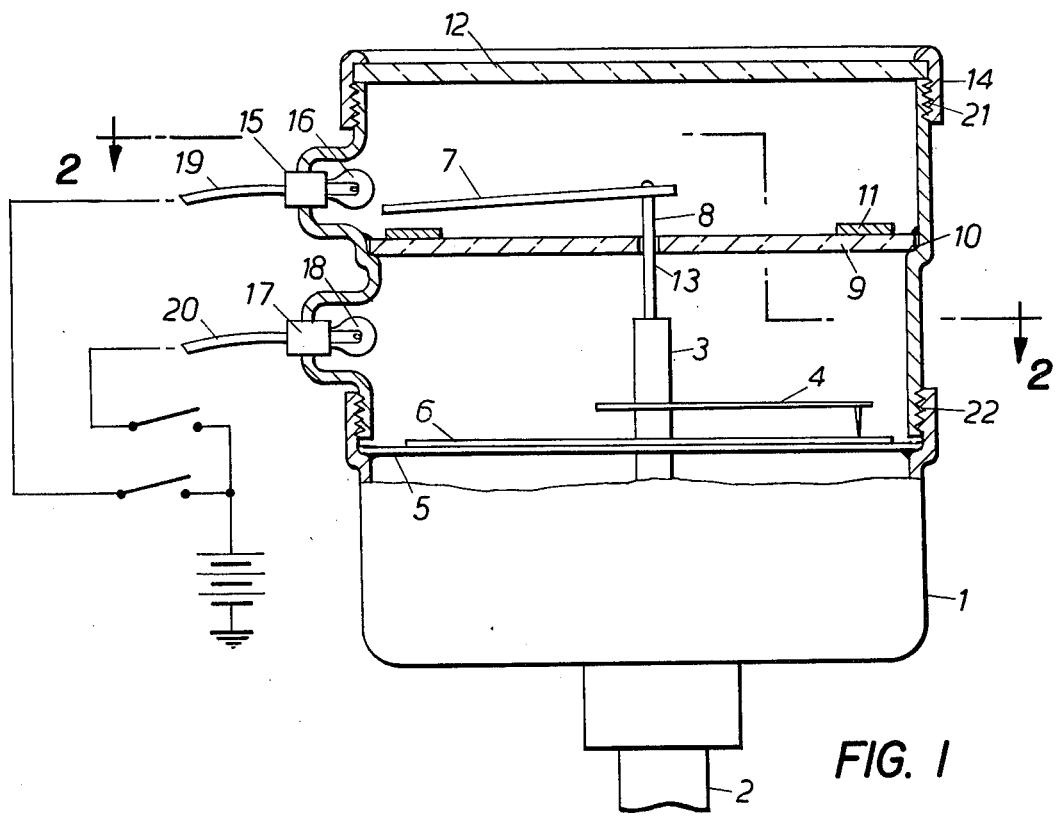
Figure 2:
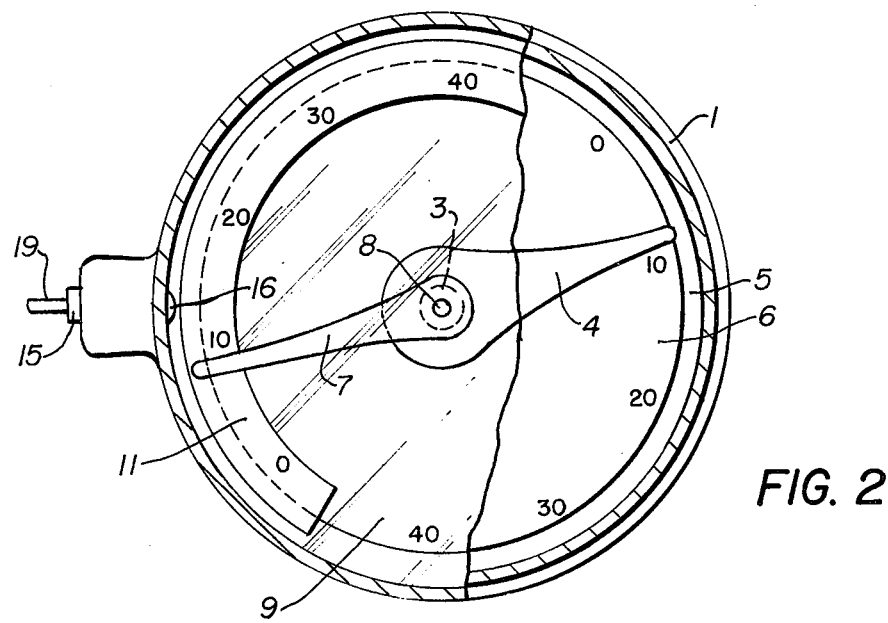

United States Patent [19]
Barrow

[11] 3,930,459
[45] Jan. 6, 1976

[54] INDICATOR INSTRUMENT ASSEMBLIES

[75] Inventor: John Harry Howard Barrow, Studham, England

[73] Assignee: General Motors Corporation, Detroit, Mich.

[22] Filed: Oct. 26, 1973

[21] Appl. No.: 410,270

[30] Foreign Application Priority Data
Nov. 16, 1972 United Kingdom............... 52889/72

[52] U.S. Cl. ........................ 116/2; 73/489; 116/116
[51] Int. Cl.²............................................ G01P 1/08
[58] Field of Search........ 116/57, 116, 124.4, 129 T, 116/124.1, 129 P, 2; 73/431, 432 A, 432 AD, 489, 495, 510; 346/18; 240/2.1

[56] References Cited
UNITED STATES PATENTS

| | | | |
|---|---|---|---|
| 2,496,488 | 2/1950 | Ohman | 116/124.1 X |
| 3,022,130 | 2/1962 | Casiglia | 346/18 X |
| 3,446,178 | 5/1969 | StClair et al. | 116/116 |
| 3,513,805 | 5/1970 | Sizer | 116/124.4 |

*Primary Examiner*—James J. Gill
*Attorney, Agent, or Firm*—P. A. Taucher

[57] ABSTRACT

A combined speedometer and tachograph assembly has speedometer and tachograph indicia respectively arranged at one and the other side of a translucent plate and respectively adapted to be illuminated by separate light sources at opposite sides of said plate, the light transmission capability of the plate being such that the speedometer indicia when viewed from said one side of the plate are visible by the reflection from the indicia of artificial or natural light incident from said one side, but the tachograph indicia are only rendered clearly visible by the transmission through the plate of light incident on the tachograph indicia from an artificial light source at the other side of the plate.

4 Claims, 2 Drawing Figures

U.S. Patent   Jan. 6, 1976   3,930,459

INDICATOR INSTRUMENT ASSEMBLIES

This invention relates to indicator instrument assemblies and more particularly to an instrument assembly for indicating a plurality of conditions. The invention has a particular application to instruments for motor vehicles in which it may be desirably to indicate, for example, not only the speed at which the vehicle is travelling, but a record of the distances travelled during different periods of operation of the vehicle and the speeds at which the vehicle was travelling during such periods. An indicating and recording instrument for such latter purpose is known as a tachograph and the present invention enables a tachograph and a speedometer to be housed in a common casing and the indications given by the speedometer and tachograph indicia to be observed without one set of indicia creating confusion or strain in the observer when he observes the other.

In an instrument assembly for indicating a plurality of conditions, according to one aspect of the present invention, the indicia for at least one condition and the indicia for the other of the conditions are respectively arranged at one and the other side of a translucent plate and are respectively adapted to be illuminated by separate light sources at opposite sides of said plate, the light transmission capability of the plate being such that the indicia of said one condition, when viewed from said one side of the plate, are visible by the reflection from the indicia of artificial or natural light incident from said one side, but the indicia of said other conditions are only rendered clearly visible by the transmission through said plate of light incident on said indicia from an artificial light source at the other side of the plate.

From another aspect, the present invention is a combined speedometer and tachometer assembly in which the speedometer and tachograph indicia are respectively arranged at one and the other side of a translucent plate and are respectively adapted to be illuminated by separate light sources at opposite sides of said plate, the light transmission capability of the plate being such that the speedometer indicia when viewed from said one side of the plate are visible by the reflection from the indicia of artificial or natural light incident from said one side, but the tachograph indicia are only rendered clearly visible by the transmission through the plate of light incident on the tachograph indicia from an artificial light source at the other side of the plate.

The said translucent plate may be of translucent plastics material or glass which is treated, as by tinting or by the deposition of a film vapour coating of metal, such as aluminium thereon, so as to substantially reflective of light incident thereon from the side at which the plate is viewed, but which appears substantially transparent to a viewer when the plate is illuminated from the opposite side from which it is viewed. Such materials are commercially available, for example for use in the windows of ambulances, for so-called "one-way mirrors," and for use in windows in which it is desirable to exclude a substantial proportion of light from one side thereof without preventing viewing through the windows from the other side.

The scope of the invention is defined by the appended claims; and the invention and the method by which it is to be performed are hereinafter particularly described with reference to the accompanying drawings in which the single FIGURE is a part sectional elevation of a combined speedometer and tachograph according to the invention.

The drawing shows a combined speedometer and tachograph in which a tachograph mechanism and a speedometer mechanism are both arranged in the lower portion of a generally cup-shaped housing 1, from the base of which there extends a drive connection, conveniently a flexible drive cable 2, by which, in known manner, a drive can be taken from the engine of a motor vehicle to the tachograph and speedometer mechanisms in the housing 1.

Extending longitudinally of the housing 1 from the tachograph mechanism is a hollow shaft 3 carrying one or more styli 4, of which only one is shown on the drawing for the sake of simplicity. The sahft 3 extends through a support plate 5 which is secured in the housing 1 and is spaced from the base thereof, and a tachograph record card 6 is carried on the support plate, the card having a central opening (not shown) by which the card 6 can be placed on or removed from the support plate 5, the opening enabling the card to be passed over the shaft 3 and stylus 4.

The tachograph mechanism and the stylus 4 incorporate in known manner means for making an indelible record on the tachograph, such means not being illustrated as they will be well understood by those skilled in the art.

The speedometer mechanism includes a speedometer needle 7 mounted on a spindle 8 which may, as shown in the drawing, extend coaxially through the tachograph shaft 3 or may extend to one side thereof. The speedometer spindle 8 and the needle 7 are detachable from the speedometer mechanism, for a purpose hereinafter described.

Arranged below the speedometer needle 7 and above the tachograph record card 6 and stylus 4 is a translucent plate 9 which is secured on a shoulder 10 formed in the wall of the housing 1, the plate having an opening 13 through which the speedometer spindle 8 extends. On its upper side the periphery of the translucent plate bears indicia 11 for the speedometer; alternatively, the shoulder 10 could be wider than that shown and the speedometer indicia could be arranged on a member mounted on said shoulder adjacent the periphery of the plate 9.

Above the translucent plate 9 and spaced therefrom is a cover glass 12 mounted in a ring 14 which screws on to a threaded rim portion 21 of the cup-shaped housing 1.

Extending through an opening in the wall of the housing 1 between the cover glass 12 and the translucent plate 9 is a bulb holder 15 in which is mounted a light bulb 16; and between the translucent plate 9 and the support plate 5 the wall of the housing 1 is formed with a further opening in which is mounted a further bulb holder 17 in which is fitted a further light bulb 18. Cables 19, 20 respectively connected to the bulb holders 15, 17 are adapted to be connected to the electrical power supply of the vehicle in which the combined speedometer-tachograph is mounted and are also connected to switches (not shown) by which the bulbs 16 and 18 may be separately energized.

The housing 1 is made in two parts detachably connected together, as by a screw threaded connection 22 adjacent the shoulder 9, or in any other convenient manner, to permit the removal of the upper portion of the housing together with the cover glass 12, translucent plate 9 and speedometer needle 7 and spindle 8, the latter being detachable from the speedometer mechanism, as mentioned above. With the upper housing part removed, the tachograph record card 6 can be removed and replaced by a fresh card, the housing parts, speedometer needle and spindle then being refitted.

The speedometer indicia 11 are arranged so as to be visible under normal daylight conditions but are adapted to be illuminated by the bulb 16 which, as shown, is arranged so that, when energized, the light therefrom is incident on the translucent plate 9 and on the speedometer indicia 11 at an angle such that the light will be predominately reflected therefrom rather than transmitted through the translucent plate 9.

The bulb 18, when energized illuminates the tachograph record card 6 and is arranged so that light reflected from the indicia marked on the record card 6 is transmitted through the translucent plate 9. The light transmission capability of the plate 9 is selected so that, when the bulb 18 providing the illumination for the tachograph record card is not energized the indicia on the tachograph record card are not visible or are only slightly visible through the translucent plate 9 and do not therefore interfere with the view of the indicia 11 of the speedometer, but, when the bulb 18 is energized, the indicia on the tachograph record card are clearly visible by light transmitted through the translucent plate 9 to the observer.

The indicia on the tachograph record card 6 are normally required to be read only when the vehicle carrying the tachograph is at rest, as for example during inspection by the police or other authorised persons, and there will be little or no danger of confusion between the two sets of records. On the other hand, when the vehicle is in motion, the arrangement according to the invention ensures that the driver's observation of the speedometer indicia 11 will not be distracted or confused by the indicia on the tachograph record card, as these indicia will then not be visible, or will not be visible to an extent which will give rise to confusion with the speedometer indicia.

The bulb 18 for illuminating the tachograph record card is preferably made of higher wattage than the bulb 16 in order that the readings on the tachograph record card may be visible upon energization of the bulb 18 when the bulb 16 is also energized, as during night-time or bad daylight conditions, necessitating artificial illumination of the speedometer dial.

I claim:

1. A combined speedometer and tachograph instrument assembly for indicating a plurality of conditions, comprising: a generally cup-shaped housing with a light opening at one end formed by a surrounding rim portion of the housing; a translucent plate supported by said housing at a peripheral edge portion and in a plane substantially normal to the line of sight through said opening by an external observer; a first set of indicia for at least one condition, including speed, to be indicated; means including said translucent plate supporting said first set of indicia in a plane parallel to said translucent plate and to one side of said translucent plate nearest said housing rim portion; another plate supported at its peripheral edge by said housing in a plane substantially parallel to the plane of said translucent plate and located to the side of said translucent plate furthest from said housing rim; a second set of indicia for indicating a condition, such as maximum speed supported by said other plate; said light opening in the housing providing a substantially unobstructed view from an external position of said first set of indicia by the illumination thereof by natural light striking said first indicia; a first light source located in said housing between said housing rim and said translucent plate characterized by the emission of light toward said one side of said translucent plate at an acute angle with respect to the plane of said translucent plate; a second light source located in said housing at a location permitting light to strike said second set of indicia and also said other side of said translucent plate; a speedometer spindle extending through an opening in said translucent plate and rotatable therein; speed-indicating means attached to said speedometer spindle for movement generally parallel to the plane of said translucent plate and with respect to said first indicia to indicate speed; a tachograph indicator member located on the other side of said translucent plate and movable relative to said second set of indicia to indicate the other of said conditions; a speedometer and tachograph drive cable extending through said housing and adapted to be connected to a drive mechanism of a motor vehicle, the speed and other conditions of which are to be indicated, by movement of said speedometer spindle and needle and said tachograph indicator member in response to changes in said condition, whereby the light from said first light source and natural illumination passing through the light opening permits viewing of the speedometer indicia by the reflection of said light from said first set of indicia and the light from said second light source permits viewing of said tachograph indicator indicia by the transmission of light through said translucent plate in a direction extending from said other side to said one side.

2. A combined speedometer and tachograph instrument assembly according to claim 1, in which said translucent plate is of tinted transparent sheet material.

3. A combined speedometer and tachograph instrument assembly according to claim 1, in which said translucent plate is of transparent sheet material and on which is deposited a film vapor coating of metal so that said plate is substantially reflective of light incident thereof from said one side from which the plate is viewed from an external direction but appears to be substantially transparent to an external viewer when the plate is illuminated from said other side.

4. A combined speedometer and tachograph instrument assembly according to claim 1, in which said second set of indicia are arranged on a tachograph record card supported on said other plate which extends across said housing to the other side of said translucent plate and through which said speedometer spindle and tachograph indicator members extend; said tachograph indicator member including at least one stylus for recording on said tachograph record card a condition indicated.

* * * * *